United States Patent
Oechslen et al.

(10) Patent No.: US 11,005,316 B2
(45) Date of Patent: May 11, 2021

(54) ELECTRICAL DRIVE DEVICE FOR A MOTOR VEHICLE

(71) Applicant: Dr. Ing. h.c. F. Porsche Aktiengesellschaft, Stuttgart (DE)

(72) Inventors: Stefan Oechslen, Stuttgart (DE); Wolfgang Merath, Argenbühl (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 15 days.

(21) Appl. No.: 16/256,487

(22) Filed: Jan. 24, 2019

(65) Prior Publication Data
US 2019/0229566 A1    Jul. 25, 2019

(30) Foreign Application Priority Data

Jan. 25, 2018    (DE) .......................... 102018101640.9

(51) Int. Cl.
| | |
|---|---|
| *H02K 1/20* | (2006.01) |
| *B60L 1/02* | (2006.01) |
| *H02K 3/24* | (2006.01) |
| *H02K 3/46* | (2006.01) |
| *H02K 9/04* | (2006.01) |
| *H02K 9/197* | (2006.01) |
| *H02K 5/20* | (2006.01) |

(52) U.S. Cl.
CPC .................. *H02K 1/20* (2013.01); *B60L 1/02* (2013.01); *H02K 3/24* (2013.01); *H02K 3/46* (2013.01); *H02K 9/04* (2013.01); *H02K 9/197* (2013.01); *H02K 5/20* (2013.01)

(58) Field of Classification Search
CPC ... B60L 1/02; H02K 1/20; H02K 3/24; H02K 5/20; H02K 9/197; H02K 1/02; H02K 3/46; H02K 9/04
USPC ............................................... 310/54, 58, 59
See application file for complete search history.

(56) References Cited

U.S. PATENT DOCUMENTS

| | | | |
|---|---|---|---|
| 4,994,700 A | 2/1991 | Bansal et al. | |
| 7,411,323 B2 | 8/2008 | Pfannschmidt et al. | |
| 2003/0057797 A1* | 3/2003 | Kaneko ................. | H02K 9/197 310/216.064 |
| 2003/0075996 A1* | 4/2003 | Yoshida ................... | H02K 1/20 310/58 |
| 2005/0206252 A1 | 9/2005 | Georg et al. | |
| 2007/0024129 A1* | 2/2007 | Pfannschmidt .......... | H02K 1/32 310/59 |
| 2011/0140551 A1* | 6/2011 | Adaniya ................ | H02K 9/197 310/64 |
| 2016/0006302 A1 | 1/2016 | Gugel et al. | |

(Continued)

FOREIGN PATENT DOCUMENTS

| | | |
|---|---|---|
| DE | 102004013133 A1 | 10/2005 |
| DE | 102014213159 A1 | 1/2016 |
| EP | 1614205 B1 | 3/2017 |

(Continued)

*Primary Examiner* — Michael Andrews
(74) *Attorney, Agent, or Firm* — RatnerPrestia

(57) ABSTRACT

An electrical drive device includes a stator and a rotor. The stator has a main body and windings of an electromagnetic coil. The main body has clearances, and the windings are at least partially arranged in the clearances. The stator has two coolant inlets and a coolant collecting device with a coolant outlet. The coolant inlets are in fluidic connection with the coolant outlet by way of the clearances.

16 Claims, 1 Drawing Sheet

(56) References Cited

U.S. PATENT DOCUMENTS

2017/0237306 A1    8/2017  Juris

FOREIGN PATENT DOCUMENTS

| EP | 3214736 A1 | 9/2017 |
| WO | 2014032876 A2 | 3/2014 |
| WO | 2017162348 A1 | 9/2017 |

* cited by examiner

ELECTRICAL DRIVE DEVICE FOR A MOTOR VEHICLE

CROSS-REFERENCE TO RELATED APPLICATION

This application claims priority to German Patent Application No. DE 10 2018 101 640.9, filed Jan. 25, 2018, which is incorporated by reference herein in its entirety.

FIELD OF THE INVENTION

The present invention relates to an electrical drive.

BACKGROUND OF THE INVENTION

Electrical drive devices with a stator and a rotor are known from the prior art. The rotor is set in rotation by electromagnetic forces, while the stator remains fixed in place. For generating the electromagnetic forces, the drive device usually has an electromagnetic coil with windings.

During the generation of the electromagnetic forces, heat is produced. A significant proportion of the heat is produced in the windings. Sufficient heat removal must be ensured in order for the drive device to function as intended. The maximum possible temperature is usually most likely to be reached in the end windings of the coil. Therefore, the end windings must be cooled particularly well. If there is not sufficient cooling, the power output of the drive device must be reduced in order to avoid overheating.

EP 1 614 205 B1, which is incorporated by reference herein, discloses a drive device in which the electromagnetic coil is cooled by air being directed into the main body in the region of the end windings. In the center of the main body, the air then heated up is removed from the main body.

SUMMARY OF THE INVENTION

Against this background, the present invention relates to achieving more efficient cooling of the windings. A motor vehicle with such cooling is also to be provided.

The electrical drive device comprises a stator and a rotor. The stator has a main body and windings of an electromagnetic coil. The main body has clearances in which the windings are at least partially arranged. The stator has two coolant inlets and a coolant collecting means with a coolant outlet. The coolant inlets are in fluidic connection with the coolant outlet by way of the clearances.

Within this description, a coolant is understood as meaning a fluid that flows from the coolant inlets through the main body to the coolant outlet and thereby absorbs and transports away heat of the windings. When it enters the coolant inlets, the coolant therefore has a lower temperature than when it leaves through the coolant outlet. The coolant is preferably liquid.

Within this description, a fluidic connection is understood as meaning in particular a connection through which a fluidic medium can flow.

The fact that the coolant flows from a number of coolant inlets by way of the clearances in which the windings are arranged to a coolant outlet means that particularly efficient cooling is achieved. Preferably, the coolant inlets lie in the region of the end windings. Then, each end winding is flowed around by relatively cold coolant and a particularly great amount of heat is transported away. On the way to the coolant outlet, the coolant flows through the clearances in which the windings are arranged, so that the windings are cooled particularly efficiently over their entire length. It should be noted here that both coolant inlets are fluidically connected to the coolant outlet. In this way, the difference in temperature between the windings flowed around by the coolant and the coolant is kept particularly great, since the coolant is not heated up over the entire length of the main body, but only up to the coolant outlet. If the coolant outlet is for example arranged in the center of the main body, the coolant from the coolant inlets only flows through half the main body in each case. As a result, the pressure loss occurring in the coolant as a result of the flow resistance is also reduced.

According to one embodiment of the invention, the coolant collecting means may have a number of coolant outlets, which are in fluidic connection with the coolant inlets by way of the clearances.

According to one embodiment of the invention, the windings may form end windings outside the clearances. The end windings and the coolant inlets may be arranged in end regions of the stator that are opposite from one another. For example, they may be two end windings and two coolant inlets. In this way, the end windings are cooled particularly efficiently. Consequently, a pump that is used for the flow of the coolant can be made smaller, more lightweight and less expensive. Furthermore, the power output capacity of the electrical drive device is increased by the particularly efficient cooling.

According to one embodiment of the invention, the coolant collecting means may have clearances that are in line with the clearances of the main body. In the clearances of the coolant collecting means, the windings may be partially arranged. Consequently, the windings can be arranged right through the main body and the coolant collecting means. The run of the windings is consequently not impaired by the coolant collecting means, or only insignificantly.

According to one embodiment of the invention, the main body may have cooling clearances, by way of which the coolant inlets are in fluidic connection with the coolant outlet. The cooling clearances may be free from the windings. The cooling clearances improve the cooling of the main body. Furthermore, an improvement of the flow conditions of the coolant can be achieved by the cooling clearances, since the pressure loss on account of the flow resistance is reduced.

According to one embodiment of the invention, the main body and the coolant collecting means may in each case have a diameter. It is possible in particular that the coolant collecting means is formed in the shape of a disk. The diameter of the coolant collecting means may be equal to the diameter of the main body or greater than the diameter of the main body. In this way, the effect can be achieved that the entire coolant flowing through the main body is collected by the coolant collecting means and directed to the coolant outlet.

According to one embodiment of the invention, the coolant collecting means may have a peripheral collecting channel. The clearances of the main body may be fluidically connected to the coolant outlet by way of the clearances of the coolant collecting means and the collecting channel. Within this description, a peripheral collecting channel is understood as meaning in particular a channel that runs along the periphery of the coolant collecting means. The coolant can therefore flow from the coolant inlets by way of the clearances of the main body and the coolant collecting means into the channel. From there, it then leaves again through the coolant outlet.

According to one embodiment of the invention, the main body may have a coolant collecting means cutout. In this coolant collecting means cutout, the coolant collecting means can be arranged. For example, the coolant collecting means cutout may be machined into the main body. This is a particularly easy way of arranging the coolant collecting means for particularly efficient cooling.

According to one embodiment of the invention, the coolant collecting means may be formed as two parts. This may be advantageous in particular in order to arrange the coolant collecting means in the coolant collecting means cutout of the main body.

BRIEF DESCRIPTION OF THE DRAWING

Further features and advantages of the present invention become clear from the following description of preferred exemplary embodiments with reference to the accompanying figures. In this case, the same references are used for the same or similar components and for components with the same or similar functions.

DETAILED DESCRIPTION OF THE INVENTION

Figure 1:
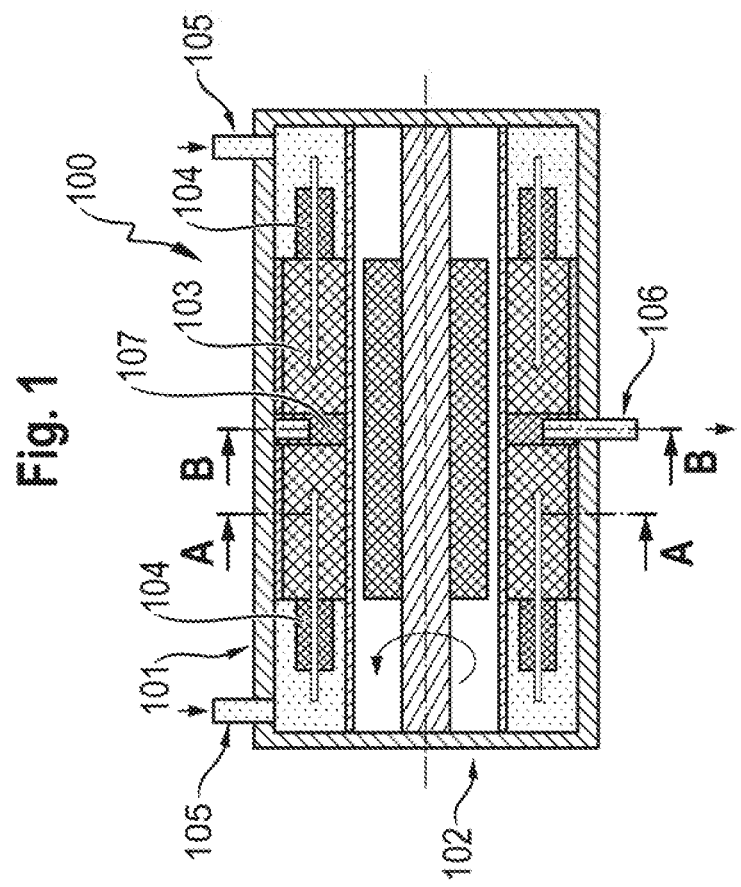
FIG. 1 shows a schematic sectional view of an electrical drive device according to one embodiment of the invention.

The electrical drive device 100 comprises a stator 101 and a rotor 102. During operation, the rotor 102 is set in rotation, while the stator 101 remains fixed in place. The stator 101 has a main body 103 and windings of an electromagnetic coil. The main body 103 has clearances 200, in which the windings are partially arranged. The windings form end windings 104 outside the main body 103 in two end regions of the stator 101 that are opposite from one another. The rotor 102 is set in rotation by electromagnetic forces. The electromagnetic forces are generated by electric current flowing through the windings.

During the generation of the electromagnetic forces, the windings are heated up, in particular in the region of the end windings 104. The heating up in the region of the end windings 104 represents a limitation here for the maximum power output capacity of the electrical drive device 100. Therefore, the better the end windings 104 are cooled, the greater the power output capacity of the electrical drive device 100.

For cooling the windings, in particular the end windings 104, a coolant is used, which is preferably a fluid. A liquid coolant is particularly preferred. The stator 101 has two coolant inlets 105, through which the coolant can flow into the stator 101. The coolant inlets 105 are arranged in the end regions of the stator 101, in which the end windings 104 are also arranged. This is advantageous since the difference in temperature between the end windings 104 and the coolant is particularly great, so that particularly efficient cooling of the end windings 104 is achieved.

The stator 101 also has a disk-shaped coolant collecting means 107 (also referred to herein as a coolant collector) with a coolant outlet 106. The coolant collecting means 107 is arranged in a central region of the stator 101. The coolant flows from the coolant inlets 105 along the end windings 104 through the clearances 200 of the main body 103, in which the windings are arranged, to the coolant outlet 106.

The coolant therefore flows in the stator 101 in two streams that are separate from one another, respectively from the ends to the center. In this way, particularly efficient cooling of the end windings 104 is achieved. Furthermore, the volumetric flow required for the cooling is reduced, so that pressure losses occurring are likewise reduced. The pump driving the coolant can consequently be made smaller, more lightweight and less expensive. Also, less energy is required by the pump.

Figure 3:
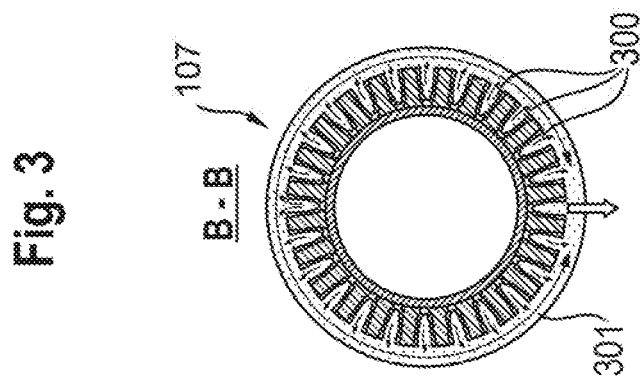
FIG. 3 shows a schematic sectional view along the line B-B from FIG. 1.
Figure 2:
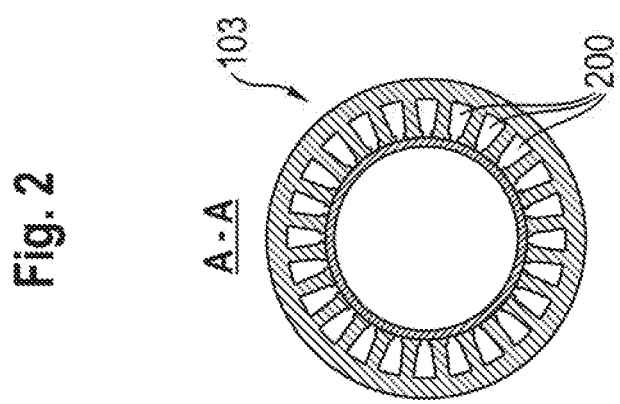
FIG. 2 shows a schematic sectional view along the line A-A from FIG. 1.

The coolant collecting means 107 is represented in FIG. 3. It is formed in the shape of a disk and is inserted in a coolant collecting means clearance of the main body 103. The coolant collecting means 107 has a number of clearances 300, which are in line with the clearances 200 of the main body 103. The windings run through the clearances 300. Furthermore, the coolant collecting means 107 have a peripheral collecting channel 301.

The coolant flows from the coolant inlets 105 through the clearances 200 of the main body 103 and the clearances 300 of the coolant collecting means 107 to the coolant outlet 106.

The functioning of the windings is not impaired by the coolant collecting means 107, since the clearances 300 are in line with the clearances 200. The coolant collecting means 107 may for example be made as two parts.

The coolant collecting means 107 makes it possible that the coolant flows from the two coolant inlets 105 in the end regions of the stator 101 that are opposite from one another through the clearances 200 and 300, in which the windings are arranged, to the centrally arranged coolant outlet 106. In this way, particularly efficient cooling of the windings, in particular the end windings 104, is achieved. The entire electrical drive device 100 can therefore achieve a higher power output or be operated with the same power output in a more energy-saving way.

What is claimed is:

1. An electrical drive device comprising:
   a stator; and
   a rotor having axis of rotation extending in an axial direction,
   wherein the stator has a main body and windings of an electromagnetic coil,
   wherein the main body has internally formed slots that extend in the axial direction, and wherein the windings are at least partially arranged in the slots,
   wherein the stator has two coolant inlets and a coolant collector with a coolant outlet, and
   wherein the coolant inlets are in fluidic connection with the coolant outlet by way of the slots,
   wherein the windings are at least partially positioned within the slots of the stator and coolant collector clearances formed in the coolant collector,
   wherein the coolant collector has radial projections that are uniformly spaced apart in a circumferential direction,
   wherein the coolant collector clearances are defined between adjacent radial projections, and
   wherein the windings are positioned directly between the adjacent radial projections.

2. The electrical drive device as claimed in claim 1, wherein the coolant collector has a number of said coolant outlets which are in fluidic connection with the coolant inlets by way of the slots.

3. The electrical drive device as claimed in claim 1, wherein the windings form end windings outside the slots, wherein the end windings and the coolant inlets are arranged adjacent end regions of the stator, and the end regions are arranged opposite from one another.

4. The electrical drive device as claimed in claim 1, wherein the coolant collector clearances are aligned with the slots of the main body.

5. The electrical drive device as claimed in claim 4, wherein the coolant inlets are in fluidic connection with the coolant outlet by way of the slots of the main body.

6. The electrical drive device as claimed in claim 4, wherein the coolant collector has a peripheral collecting channel, and wherein the slots of the main body are fluidically connected to the coolant outlet by way of the coolant collector clearances of the coolant collector and the peripheral collecting channel.

7. The electrical drive device as claimed in claim 1, wherein the main body and the coolant collector in each case have a diameter, wherein the diameter of the coolant collector is equal to the diameter of the main body or greater than the diameter of the main body.

8. The electrical drive device as claimed in claim 1, wherein the main body has a coolant collector cutout, wherein the coolant collector is arranged in the coolant collector cutout.

9. A motor vehicle, comprising the electrical drive device as claimed in claim 1.

10. The electrical drive device as claimed in claim 1, wherein the slots of the main body are spaced apart circumferentially, and the coolant collector clearances of the coolant collector are spaced apart circumferentially.

11. The electrical drive device as claimed in claim 1, wherein the slots of the main body are spaced apart circumferentially, the coolant collector clearances of the coolant collector are spaced apart circumferentially, and the slots of the main body and the coolant collector clearances of the coolant collector are spaced apart by a same circumferential distance.

12. The electrical drive device as claimed in claim 1, wherein the coolant collector comprises an annular disk and the coolant collector clearances are formed within the annular disk and across a thickness of said annular disk.

13. The electrical drive device as claimed in claim 1, wherein one of the coolant collector clearances is radially aligned with the coolant outlet.

14. The electrical drive device as claimed in claim 1, wherein the slots are radially aligned to register with the coolant collector clearances.

15. The electrical drive device as claimed in claim 1, wherein an outer diameter of the coolant collector is greater than an outer diameter of the stator.

16. The electrical drive device as claimed in claim 1, wherein the windings are uniformly spaced apart in a circumferential direction, and the slots are also uniformly spaced apart in a circumferential direction.

\* \* \* \* \*